March 31, 1942.  M. ESSL  2,277,822
VALVE MECHANISM
Filed Feb. 26, 1940
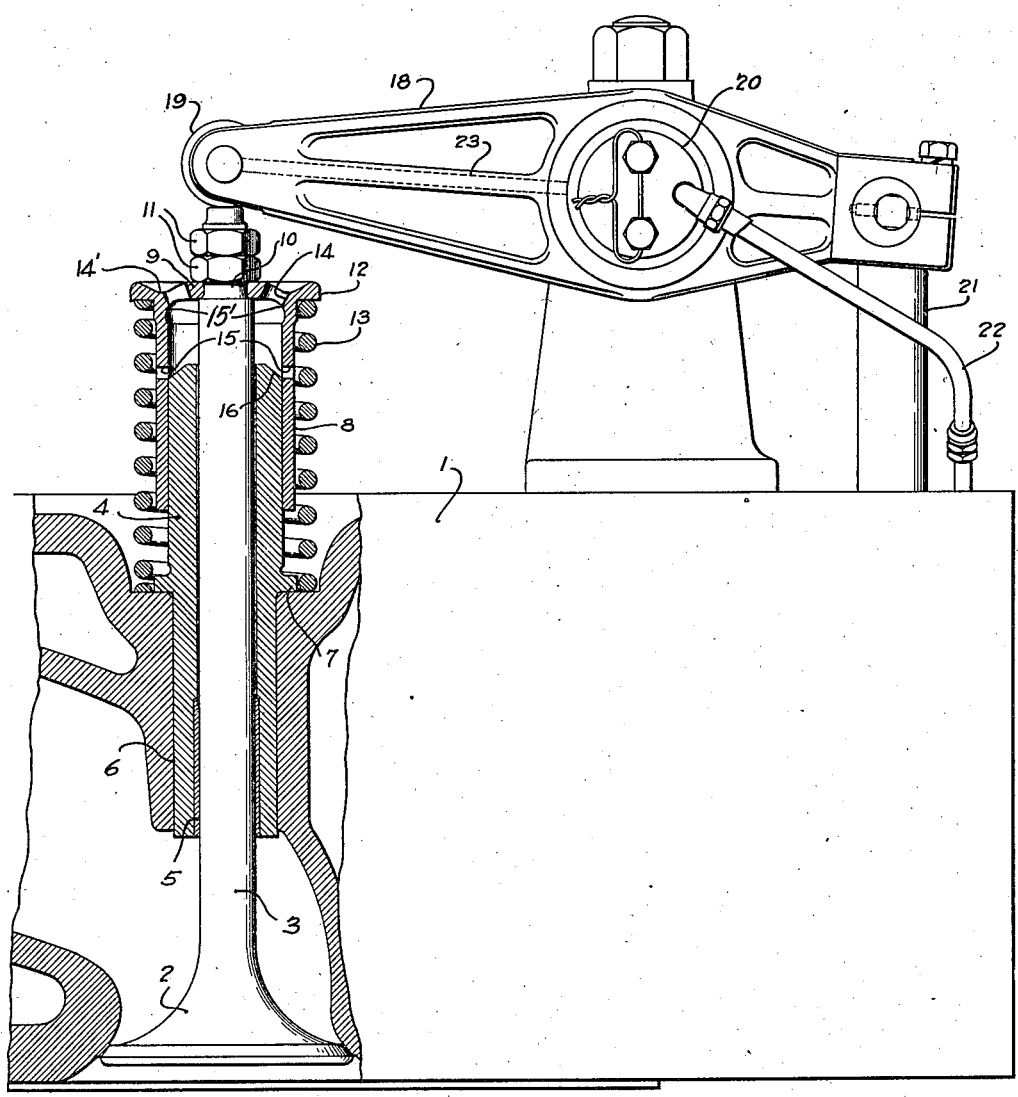
INVENTOR
MAX ESSL
BY
ATTORNEY Patented Mar. 31, 1942

2,277,822

UNITED STATES PATENT OFFICE 2,277,822

VALVE MECHANISM

Max Essl, Norwood, Pa., assignor to The Baldwin Locomotive Works, a corporation of Pennsylvania Application February 26, 1940, Serial No. 320,960

5 Claims. (Cl. 184—6)

This invention relates generally to internal combustion engines employing poppet valves and relates more particularly to improved means for guiding the valve stems.

One of the problems in connection with poppet type valves, especially when used in Diesel engines of relatively large horsepower wherein it is difficult to obtain adequate dissipation of the large amount of heat incident to large power capacities, is that this heat tends to carburize the lubricating oil for the valve stem and thereby causes the valve to stick or operate sluggishly with consequent damage to the valve or lowered efficiency of operation. This difficulty has in some instances been overcome only by supplying a nicely delicately balanced amount of oil to the valve stem so that proper lubrication takes place without the possibility of any excess oil being carburized. However, the amount of oil required depends upon the speed and power at which an engine may be operating at any given time and hence it is seen that for an engine operating under widely varying conditions it is extremely difficult to provide just the right amount of oil for perfect operation under all conditions.

A great many different arrangements have heretofore been proposed and used with varying degrees of success but the same have been deficient from either structural, functional or economic standpoints. A device is not satisfactory even though it may be functionally correct if that device has an excessive initial cost or if its parts are so related that the parts are not readily accessible for inspection or repair or if the parts require excessive space.

An object of my invention is to provide an improved guide arrangement for a valve stem.

It is a further object of my invention to provide an improved valve stem guide that will allow oil in an excess amount to be used in the lubrication of the valve mechanism without danger of carburizing the oil or sticking of the valve incident thereto.

It is another object of my invention to provide an improved valve stem guide arrangement that is simple, compact and economical in construction, operation and maintenance and that is readily accessible for inspection and repair, while at the same time allowing adequate lubrication of the valve stem guiding means without danger of carburizing the oil on the valve stem.

Other objects and advantages will be more apparent to those skilled in the art from the following description of the accompanying drawing which is an elevational view of a cylinder head partially broken away to show a valve mechanism embodying my arrangement.

In the particular embodiment of the invention such as is disclosed herein merely for the purpose of illustrating one specific form among possible others that the invention might take in practice, I have shown a cylinder head 1 of any usual type adapted to be mounted upon or formed integrally with the upper end of a usual cylinder not shown. The problem of sticking valves is especially acute with exhaust valves, although my invention is equally applicable to intake valves when it is desirable to employ the invention therewith. However, for purposes of illustration the valve 2 may be considered to be an exhaust valve whose stem 3 extends through a valve bushing 4 having slightly larger clearance with the valve stem than is ordinarily required with valves that are guided solely by the bushing. In other words, the stem does not have contact with the guide 4. The lower end of the valve may be centrally guided by a bushing 5 made preferably of cast iron and suitably pressed into the lower end of bushing 4 which, in turn, is also pressed within a circular bore 6 formed in the cylinder head. A suitable flange 7 is formed integrally with bushing 4, the upper cylindrical end of the bushing being somewhat larger in diameter than the lower portion that is pressed into the bore 6.

A guide sleeve 8 has its internal cylindrical bore provided with a nice sliding fit on the upper end of bushing 4, while the upper end of sleeve 8 is provided with an end portion 9 which has lateral and axial engagement with the valve stem preferably being firmly clamped on to a reduced valve stem portion 10 by nuts 11. A flange 12 engages the upper end of a valve spring 13, the lower end of which preferably rests on the cylinder casting just outside of the flange 7 so as to be centralized thereby. Adequate lubrication may enter the interior of sleeve 8 through one or more openings 14 and while a certain very limited amount of this oil may come in contact with the valve stem the oil will primarily flow downwardly along the internal surface of sleeve 8 and flow outwardly through a plurality of oil ports 15. The internal surface of the sleeve adjacent ports 14 is preferably inclined outwardly and downwardly to insure that the oil will flow from the port 14 to the inner surface of the sleeve, said inclined surface being specifically shown as curved at 15'. The upper end 9 is preferably provided with an oil accumulating groove 14' with which port 14 communicates. A circular inclined oil directing surface 16 will insure adequate deflection of the oil into port 15 when the valve 2 is in its closed position as shown in the drawing.

However, when the valve is open, then the openings 15 preferably are cut off by the valve bushing 4 thereby insuring adequate accumulation of oil at all times within the sleeve interior, although, if desired, under certain circumstances the ports 15 could allow continuous drainage from the sleeve interior provided that a sufficient volume of oil was continually admitted to the interior of the sleeve. In addition, it is possible by this arrangement to permit an unlimited quantity of oil to be supplied to the sleeve 8 directly on to the outside thereof. The ports 14 and 15 also allow atmospheric pressure in the sleeve interior thereby preventing any cushioning effect of the valve during this down stroke.

The large clearance between the valve stem and the upper end of the valve guide has a dual purpose, namely, to take care of expansion of the valve stem and to insure that the valve stem does not touch the valve guide inasmuch as the function of sleeve 8 is to guide valve stem 3 concentrically within the valve guide 4 without making contact therewith. Lubrication of the valve stem is not necessary because of the upper end of the valve stem being held by sleeve 8 centrally within the valve guide with a uniform clearance therewith, which clearance is greater than the running clearance between the sleeve 8 and bushing 4.

The foregoing arrangement has been found to be particularly effective in eliminating carburization of oil around the valve stem and consequently has eliminated valve sticking and at the same time it has been possible to supply a generous amount of oil to the sleeve 8 so that it operates with entire satisfaction through widely varying operating conditions of speed and power. This improved arrangement allows extra clearance tolerance between the valve stem and valve bushing and this clearance is compensated for by firmly clamping the valve stem to the sleeve 8 thereby centrally holding the valve stem during its down movement by a usual oscillating rocker arm 18 and valve stem engaging roller 19. It is understood of course that the rocker arm 18 is suitably pivotally supported at 20 to be operated by a push rod 21 from a usual and well-known cam. Oil may be supplied to the valve either by a direct discharge of oil on to the top of the valve sleeve or, if desired, oil may be supplied through a pipe 22 to rocker pivot 20 and thence through rocker arm passage 23 to roller 19 from which the oil flows downwardly into the oil groove 14'.

My improved arrangement not only has the foregoing functional and structural advantages but also has the further advantage of having the valve spring 13 located on the outside of the guide sleeve 8 thereby insuring ease of inspection and repair at all times with minimum time or cost in removing the spring or guide sleeve.

It will of course be understood that various changes in details of construction and arrangement of parts may be made by those skilled in the art without departing from the spirit of the invention as set forth in the appended claims.

I claim:

1. A valve mechanism comprising, in combination, a valve having a stem, a bushing having a bore through which said stem extends in close relation thereto, a sleeve slidably supported on the outside of said bushing and engaging said valve stem to centrally support the same, a valve spring disposed on the outside of said sleeve and engageable therewith, means for admitting lubricating oil to the interior of said sleeve, means for discharging oil from the interior of said sleeve at a point above the upper end of said bushing, and means located at the upper end of said bushing for diverting oil in a direction away from said valve stem toward said discharge means.

2. The combination set forth in claim 1 further characterized in that said sleeve has an end portion firmly clamped to the valve stem.

3. The combination set forth in claim 1 further characterized by the provision of an end member for the sleeve laterally and axially engaging the valve stem and said oil admission means including a port in said end member through which lubricating oil may be supplied to the interior of the sleeve adjacent the inner wall thereof.

4. A valve mechanism comprising, in combination, a valve having a stem, a bushing having a bore through which said stem extends in close relation thereto, a sleeve slidably supported on the outside of said bushing and having an end member laterally and axially engaging said valve stem to centrally support the same, a valve spring disposed on the outside of said sleeve and engageable therewith, a port in said end member through which lubricating oil may be supplied to the interior of the sleeve adjacent the inner wall thereof, a discharge port extending through the side of said sleeve and having communication with the interior thereof when adjacent the upper end of said bushing, and an outwardly bevelled annular surface on the upper outer corner of said bushing for deflecting oil into said discharge port in a direction away from said valve stem so as to minimize contact of oil with said stem.

5. The combination set forth in claim 4 further characterized in that the end member of said sleeve is normally spaced from the end of the valve bushing when the valve is in its closed position and said discharge port is disposed above the end of said bushing so as to communicate with the interior of the sleeve when the valve is closed but is adapted to be covered by the valve bushing when the valve has moved to a predetermined open position.

MAX ESSL.